United States Patent
Yan

(10) Patent No.: US 11,838,387 B2
(45) Date of Patent: Dec. 5, 2023

(54) FOG NODE SCHEDULING METHOD AND APPARATUS, COMPUTER DEVICE, AND STORAGE MEDIUM

(71) Applicant: Tencent Technology (Shenzhen) Company Limited, Shenzhen (CN)

(72) Inventor: Qinhuai Yan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/950,977

(22) Filed: Sep. 22, 2022

(65) Prior Publication Data

US 2023/0010046 A1 Jan. 12, 2023

Related U.S. Application Data

(63) Continuation of application No. PCT/CN2021/122151, filed on Sep. 30, 2021.

(30) Foreign Application Priority Data

Nov. 12, 2020 (CN) .......................... 202011258119.0

(51) Int. Cl.
  *H04L 67/60* (2022.01)
  *H04L 67/1004* (2022.01)

(52) U.S. Cl.
  CPC .......... *H04L 67/60* (2022.05); *H04L 67/1004* (2013.01)

(58) Field of Classification Search
  CPC .. H04L 67/60; H04L 67/1004; H04L 67/1001
  See application file for complete search history.

(56) References Cited

U.S. PATENT DOCUMENTS

| 11,144,362 B1* | 10/2021 | Chen | G06F 9/5077 |
| 2017/0272365 A1* | 9/2017 | Wei | H04L 45/302 |

(Continued)

FOREIGN PATENT DOCUMENTS

| CN | 103246550 A | 8/2013 |
| CN | 104394441 A | 3/2015 |

(Continued)

OTHER PUBLICATIONS

Tencent Technology, ISR, PCT/CN2021/122151, Dec. 1, 2021, 3 pgs.

(Continued)

*Primary Examiner* — Jimmy H Tran
(74) *Attorney, Agent, or Firm* — Morgan, Lewis & Bockius LLP

(57) ABSTRACT

This application relates to a fog node scheduling method performed by a computer device, and a storage medium. The method includes: searching for candidate fog nodes storing a resource requested by a fog node scheduling request initiated by a client; performing effectiveness filtration on the candidate fog nodes to obtain effective fog nodes having predefined connectivity with the client; acquiring collected load information of the effective fog nodes; performing scheduling in the effective fog nodes based on the load information to obtain a scheduling result, where the scheduling result includes an identification of a target fog node obtained through scheduling and service flow allocated to the target fog node; and returning the scheduling result to the client so that the client can acquire the resource from the target fog node according to the identification and the service flow.

20 Claims, 8 Drawing Sheets

(56) References Cited

U.S. PATENT DOCUMENTS

| | | | |
|---|---|---|---|
| 2017/0366472 A1* | 12/2017 | Byers | H04L 67/289 |
| 2018/0063261 A1* | 3/2018 | Moghe | G08G 1/123 |
| 2018/0074855 A1 | 3/2018 | Kambatla | |
| 2018/0109428 A1* | 4/2018 | Kattepur | H04W 4/70 |
| 2018/0159745 A1* | 6/2018 | Byers | H04L 41/122 |
| 2018/0176317 A1* | 6/2018 | Hwang | H04L 67/34 |
| 2018/0295066 A1* | 10/2018 | Pawar | H04L 47/724 |
| 2018/0316725 A1* | 11/2018 | Mani | H04L 67/125 |
| 2019/0028552 A1* | 1/2019 | Johnson, II | H04L 67/146 |
| 2019/0188043 A1* | 6/2019 | Jalai | G06F 9/4875 |
| 2019/0190802 A1* | 6/2019 | Jalali | H04L 67/1042 |
| 2019/0245806 A1* | 8/2019 | Hanes | H04L 47/722 |
| 2019/0317818 A1* | 10/2019 | Krishna Rao | H04L 67/10 |
| 2019/0364110 A1* | 11/2019 | Henry | H04L 67/12 |
| 2019/0377592 A1* | 12/2019 | Verma | G06F 9/45558 |
| 2020/0036779 A1* | 1/2020 | Enguehard | H04L 67/1031 |
| 2020/0044918 A1* | 2/2020 | Byers | H04L 47/74 |
| 2020/0077425 A1* | 3/2020 | Silverman | H04W 72/1273 |
| 2020/0145348 A1* | 5/2020 | Byers | H04L 47/80 |
| 2020/0162503 A1* | 5/2020 | Shurtleff | H04L 41/0883 |
| 2020/0177485 A1* | 6/2020 | Shurtleff | H04L 67/12 |
| 2020/0228602 A1* | 7/2020 | Spoczynski | H04L 67/56 |
| 2020/0252295 A1* | 8/2020 | Nolan | G06F 16/245 |
| 2020/0296155 A1* | 9/2020 | McGrath | G06F 9/5027 |
| 2020/0328977 A1* | 10/2020 | Pfister | H04L 67/5681 |
| 2021/0011765 A1* | 1/2021 | Doshi | G06F 9/5083 |
| 2021/0021533 A1* | 1/2021 | Guim Bernat | H04L 47/788 |
| 2021/0067602 A1* | 3/2021 | Kottapalli | H04L 47/76 |
| 2021/0119933 A1* | 4/2021 | Bhagavatula | H04L 47/28 |
| 2021/0208943 A1* | 7/2021 | Baughman | G06F 8/61 |
| 2021/0208946 A1* | 7/2021 | Watfa | G06F 9/5083 |
| 2021/0274581 A1* | 9/2021 | Schmitz | H04L 67/535 |
| 2021/0286655 A1* | 9/2021 | Liu | G06F 9/5083 |
| 2021/0336839 A1* | 10/2021 | He | H04L 41/18 |
| 2021/0349799 A1* | 11/2021 | Grant | G06F 11/3089 |
| 2021/0390021 A1* | 12/2021 | Baughman | H04W 64/003 |
| 2021/0392055 A1* | 12/2021 | Mohan | H04L 67/1008 |
| 2021/0406081 A1* | 12/2021 | Eidenbenz | G06F 9/5077 |
| 2021/0406770 A1* | 12/2021 | Birke | G06F 9/5027 |
| 2021/0409482 A1* | 12/2021 | Eidenbenz | H04L 67/10 |
| 2022/0066901 A1* | 3/2022 | Bhorkar | G06F 9/5072 |
| 2022/0086242 A1* | 3/2022 | Murphy | H04L 9/0637 |
| 2022/0166848 A1* | 5/2022 | Banerjee | H04L 67/535 |
| 2022/0197773 A1* | 6/2022 | Butler | H04N 21/234 |
| 2022/0223035 A1* | 7/2022 | Yang | H04N 7/181 |
| 2022/0303181 A1* | 9/2022 | Nolan | H04W 12/69 |
| 2022/0318066 A1* | 10/2022 | Bartfai-Walcott | G06F 9/5083 |
| 2022/0329506 A1* | 10/2022 | Satheesh Kumar | H04L 43/0811 |
| 2022/0382586 A1* | 12/2022 | Bernat | G06F 9/48 |
| 2023/0085361 A1* | 3/2023 | Bhorkar | H04L 43/0894 |
| 2023/0110131 A1* | 4/2023 | Smith | G06F 16/1824 370/254 |
| 2023/0114468 A1* | 4/2023 | Strong | G06F 16/538 382/173 |

FOREIGN PATENT DOCUMENTS

| | | |
|---|---|---|
| CN | 105847381 A | 8/2016 |
| CN | 110661879 A | 1/2020 |
| CN | 110830565 A | 2/2020 |
| CN | 112073542 A | 12/2020 |
| WO | WO 2020019472 A1 | 1/2020 |

OTHER PUBLICATIONS

Tencent Technology, WO, PCT/CN2021/122151, Dec. 30, 2021, 5 pgs.

Tencent Technology, IPRP, PCT/CN2021/122151, May 16, 2023, 6 pgs.

* cited by examiner

FOG NODE SCHEDULING METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2021/122151, entitled "FOG NODE SCHEDULING METHOD AND APPARATUS, AND COMPUTER DEVICE AND STORAGE MEDIUM" filed on Sep. 30, 2021, which claims priority to Chinese Patent Application No. 202011258119.0, filed with the State Intellectual Property Office of the People's Republic of China on Nov. 12, 2020, and entitled "FOG NODE SCHEDULING METHOD AND APPARATUS, COMPUTER DEVICE, AND STORAGE MEDIUM", all of which are incorporated herein by reference in their entirety.

FIELD OF THE TECHNOLOGY

This application relates to the field of Internet technologies, and in particular, to a fog node scheduling method and apparatus, a computer device, and a storage medium.

BACKGROUND OF THE DISCLOSURE

With the high-speed development of the Internet technology, the number of Internet users is rapidly increased, which brings more and more pressure to a cloud server, and meanwhile the service quality of the business will be affected by the higher pressure of the cloud server. To better serve the users, persons skilled in industry focus on fog nodes closer to the users, effectively organize and integrate the fog nodes into a fog computing service. Fog computing is a decentralized infrastructure that places storage and processing components at the edge of the cloud, where data sources such as application users and sensors exist.

In a conventional solution, when needing to use the fog nodes for service, a user side will send a service request to a back-end server, the back-end server will inquire the corresponding fog node according to the service request and then feeds the inquired fog node to the user side, and accordingly the user side provides the corresponding service according to the fed-back fog node. However, the fog nodes obtained by the conventional solution possibly cannot ensure reliable and stable proceeding of the service for the users.

SUMMARY

According to various embodiments provided in this application, a fog node scheduling method and apparatus, a computer device, and a storage medium are provided.

A fog node scheduling method is performed by a server, and includes:
  searching for candidate fog nodes storing a resource requested by a fog node scheduling request initiated by a client;
  performing effectiveness filtration on the candidate fog nodes to obtain effective fog nodes having predefined connectivity with the client;
  acquiring collected load information of the effective fog nodes;
  performing scheduling in the effective fog nodes based on the load information to obtain a scheduling result, where the scheduling result includes an identification of a target fog node obtained through scheduling and service flow allocated to the target fog node; and
  returning the scheduling result to the client, wherein the client is configured to acquire the resource from the target fog node according to the identification and the service flow.

A fog node scheduling apparatus includes:
  a search module configured to search for candidate fog nodes storing a resource requested by a fog node scheduling request initiated by a client;
  a filter module configured to perform effectiveness filtration on the candidate fog nodes to obtain effective fog nodes having predefined connectivity with the client;
  an acquisition module configured to acquire collected load information of the effective fog nodes;
  a scheduling module configured to perform scheduling in the effective fog nodes based on the load information to obtain a scheduling result, where the scheduling result includes an identification of a target fog node obtained through scheduling and service flow allocated to the target fog node; and
  a feedback module configured to return the scheduling result, wherein the client is configured to acquire the resource from the target fog node according to the identification and the service flow.

A computer device is provided, including a memory and a processor, the memory storing computer-readable instructions that, when executed by the processor, cause the computer device to implement the following operations:
  searching for candidate fog nodes storing a resource requested by a fog node scheduling request initiated by a client;
  performing effectiveness filtration on the candidate fog nodes to obtain effective fog nodes having predefined connectivity with the client;
  acquiring collected load information of the effective fog nodes;
  performing scheduling in the effective fog nodes based on the load information to obtain a scheduling result, where the scheduling result includes an identification of a target fog node obtained through scheduling and service flow allocated to the target fog node; and
  returning the scheduling result to the client, wherein the client is configured to acquire the resource from the target fog node according to the identification and the service flow.

A non-transitory computer-readable storage medium is provided, storing computer-readable instructions, and the computer-readable instructions, when executed by a processor of a computer device, implementing the following steps:
  searching for candidate fog nodes storing a resource requested by a fog node scheduling request initiated by a client;
  performing effectiveness filtration on the candidate fog nodes to obtain effective fog nodes having predefined connectivity with the client;
  acquiring collected load information of the effective fog nodes;
  performing scheduling in the effective fog nodes based on the load information to obtain a scheduling result, where the scheduling result includes an identification of a target fog node obtained through scheduling and service flow allocated to the target fog node; and
  returning the scheduling result to the client, wherein the client is configured to acquire the resource from the target fog node according to the identification and the service flow.

A computer-readable instruction product is provided, where the computer-readable instruction product includes computer-readable instructions, and the computer instructions are stored in a computer-readable storage medium. The processor of the computer device reads the computer-readable instructions from the computer-readable storage medium, and the processor executes the computer-readable instructions, to cause the computer device to perform the foregoing fog node scheduling method.

Details of one or more embodiments of this application are provided in the subsequent accompanying drawings and descriptions. Other features, objectives, and advantages of this application become apparent from the specification, the accompanying drawings, and the claims.

BRIEF DESCRIPTION OF THE DRAWINGS

To describe the technical solutions in the embodiments of this application more clearly, the accompanying drawings required for describing the embodiments are briefly described hereinafter. Apparently, the accompanying drawings in the following description show merely some embodiments of this application, and a person of ordinary skill in the art may obtain other accompanying drawings from these accompanying drawings without creative efforts.

DESCRIPTION OF EMBODIMENTS

To make the objectives, technical solutions, and advantages of this application clearer and more understandable, this application is further described in detail below with reference to the accompanying drawings and the embodiments. It is to be understood that the specific embodiments described herein are only used for explaining this application, and are not used for limiting this application.

Figure 1:
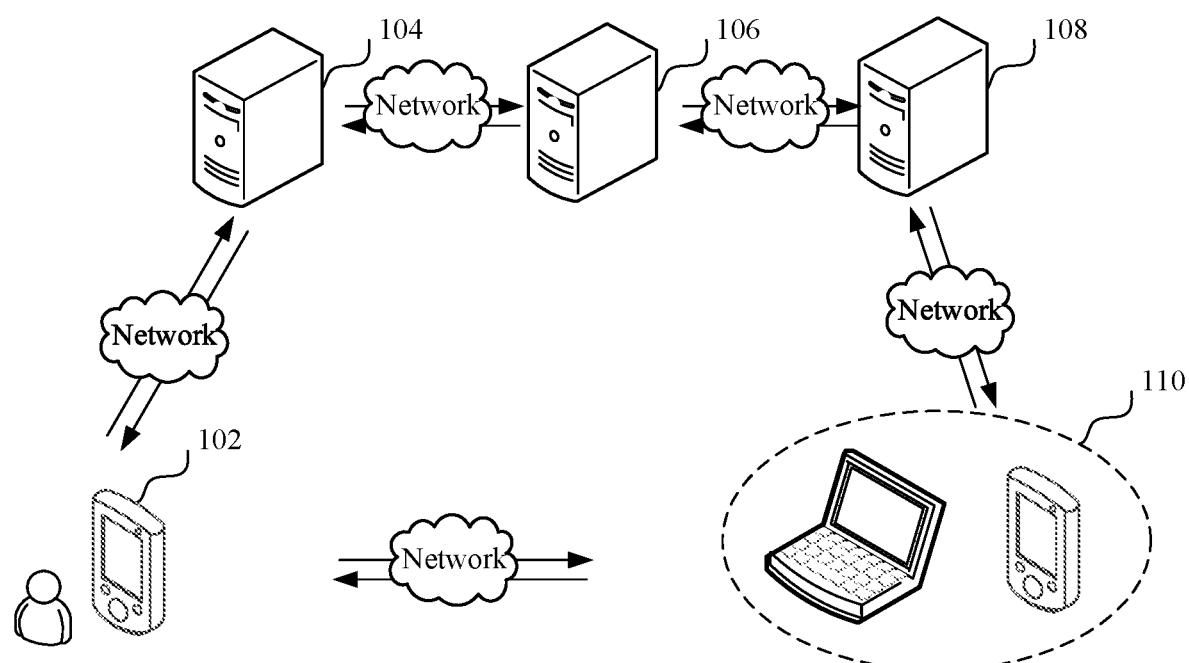
FIG. 1 is a diagram of an application environment of a fog node scheduling method according to an embodiment.

A fog node scheduling method provided by this application may be applied to an application environment shown in FIG. 1. The application environment includes a terminal 102, a scheduling server 104, an index server 106, an information acquisition server 108 and a fog node 110.

The terminal 102 is provided with a client, may issue a fog node scheduling request through the client and acquires resources from a target fog node according to service flow on the basis of a fed-back scheduling result. The terminal 102 and the fog node 110 may be a smartphone, a tablet computer, a notebook computer, a desktop computer, a smart speaker, a smartwatch, or the like, but is not limited thereto.

The scheduling server 104 may respond to the fog node scheduling request initiated by the client, schedules the fog node 110 and feeds the scheduling result back to the client.

The index server 106 stores all resource information in a fog computing Peer-to-Peer Content Delivery Network (PCDN) service, and the resource information includes a resource file name, a resource ID, a file size, a file check code, etc.; and in addition, information of all on-line fog nodes is further stored and includes equipment information of the fog nodes, network information, load information, etc. The index server 106 further maintains a mapping relation between the resource and fog nodes, and thus for a certain resource, the scheduling server 104 can rapidly inquire the fog nodes with the resource, thereby rapidly determining a range for fog node scheduling.

The information acquisition server 108 is configured to collect the equipment information, the network information, the load information, etc. of the fog node 110. In addition, the information acquisition server 108 may compute an upload bandwidth predicted value at next moment through a least square method according to a real-time upload bandwidth value of each line on the fog node, and synchronously sends the upload bandwidth predicted value to the index server 106.

The fog node 110 may report the own network information and load information and information of the other fog nodes to the information acquisition server 108. The specifically-reported information includes the equipment information, the network information and the load information of the fog node. The equipment information includes a fog node identification (ID) and a fog node equipment supplier identification. The network information includes information of a network with the fog node, an Internet Protocol (IP) address of the fog node and other information. The load information includes a central processing unit (CPU) information of the fog node, an internal memory usage information of the fog node, an upload bandwidth value of the fog node, etc.

The scheduling server 104, the index server 106 and the information acquisition server 108 may be independent physical servers and may also be an integration server with functions of the above three servers; In addition, the server may be alternatively a server cluster formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform.

The terminal 102, the scheduling server 104, the index server 106, the information acquisition server 108 and the fog node 110 may be connected through Bluetooth, a Universal Serial Bus (USB) or a network or other communication link manners, which is not limited by this application.

Figure 2:
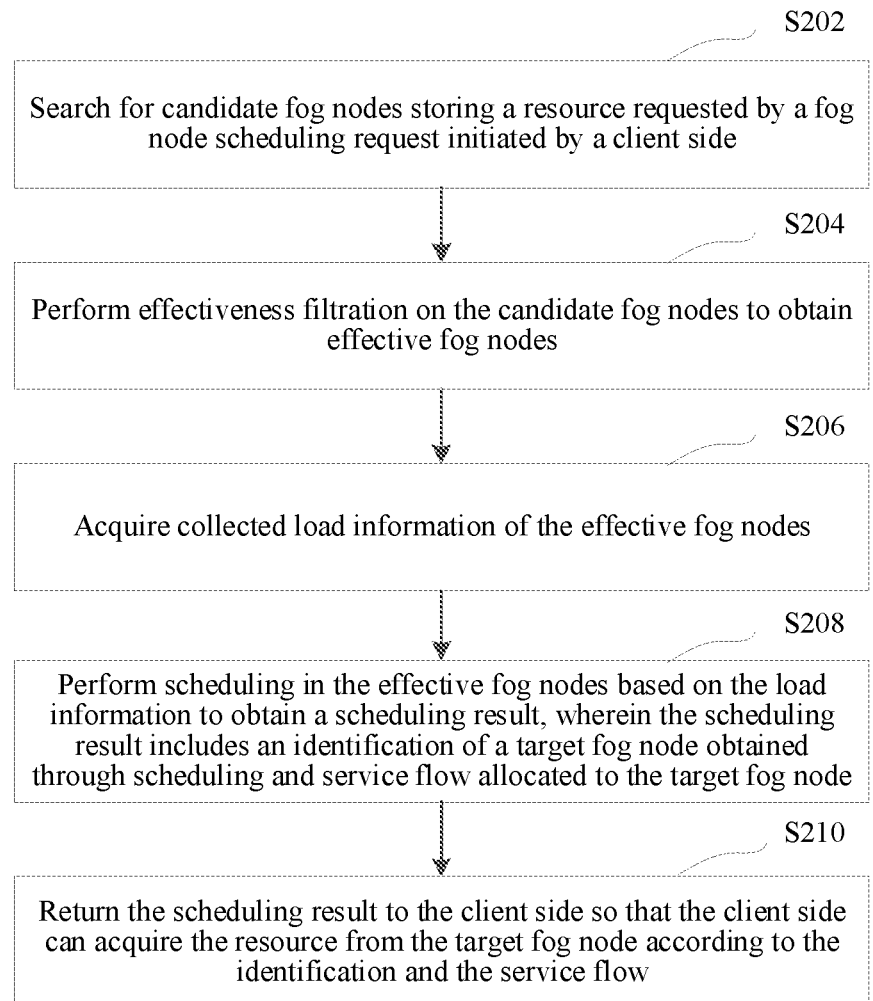
FIG. 2 is a schematic flowchart of a fog node scheduling method according to an embodiment.

In an embodiment, as shown in FIG. 2, a fog node scheduling method is provided, and the method applied to a scheduling server 104 (hereinafter referred to as the server) shown in FIG. 1 is exemplarily explained and includes the following steps:

S202. Search for candidate fog nodes storing a resource requested by a fog node scheduling request when the fog node scheduling request initiated by a client is received.

The client may be a program installed on a terminal and providing a local service for a client, such as a video client providing a video-on-demand or download service, and a fog node scheduling request about video on demand or video download may be initiated to the scheduling server through the video client.

Fog nodes may be equipment providing services in fog computing, such as mobile phones, tablet personal computers or notebook computers of the other users, and when the client demands for a video resource, the video resource may be downloaded from the equipment, with the video resource, of the other users.

The fog node scheduling request may be used for requesting for the server to schedule the fog nodes storing corresponding resources and feeds a scheduling request to the client. Scheduling may refer to that a part of fog nodes are selected from the fog nodes storing the corresponding resources and are allocated to the client so that the client can perform corresponding services through the part of fog nodes, for example, the video resource is downloaded from the scheduled part of fog nodes, or corresponding service data are processed from the scheduled part of fog nodes.

In an embodiment, when a fog node scheduling request initiated by a client is received, a server determines a requested resource according to the fog node scheduling request and then searches for all fog nodes with the resource, and all the sought fog nodes may serve as candidate fog nodes; or a part of fog nodes are selected from all the sought fog nodes to serve as the candidate fog nodes according to a data size of the resource. For example, for a video resource, when the video resource is a short video and there are many sought fog nodes, a part of fog nodes may be selected from all the sought fog nodes to serve as the candidate fog nodes; and in addition, all the sought fog nodes may serve as the candidate fog nodes.

In an embodiment, step S202 may specifically include the following steps: A server acquires resource information of a resource requested by a fog node scheduling request. Mapped fog node information is searched with the resource information as an index based on a pre-stored mapping relation from the resource information to fog node information to obtain candidate fog nodes.

The resource information may be related to the resource and includes but not limited to a resource file name, a resource ID, a file size, a file check code and other information. The mapping relation may refer to a mapping relation between the resource and the fog nodes, and the fog nodes with the resource can be obtained according to the mapping relation when the resource information is sought. It is to be indicated that the resource may be various data resources in a network and includes but not limited to videos, audio, texts, images and other data resources. The stored resources are shown in a file form, thus, the above file name is a resource name, the above file size is a resource size, and the above file check code is a resource check code.

The mapping relation from the resource information to the fog node information also refers to a mapping relation from the resources to the fog nodes.

In an embodiment, the above step of acquiring the resource information according to the fog node scheduling request specifically may include: Acquire locally-cached resource information through a server according to the fog node scheduling request when the resource information corresponding to the fog node scheduling request is locally cached. Send an inquiry request to an index server when no resource information corresponding to the fog node scheduling request is locally cached, thereby enabling the index server to inquire the resource information corresponding to the resource based on the inquiry request. Receive the resource information fed back by the index server.

Specifically, the server detects whether the resource information corresponding to the fog node scheduling request is locally cached or not; if yes, the locally-cached resource information is acquired according to the fog node scheduling request; and if not, the inquiry request is sent to the index server, and the resource information inquired and fed back by the index server in response to the inquiry request.

The server may cache the resource information, related information of the fog nodes and the mapping relation from the resources to the nodes so that when the fog node scheduling request initiated by the client is received, a local cache can be searched for the resource information corresponding to the fog node scheduling request and candidate fog nodes with the resource requested by the fog node scheduling request according to the resource information and the mapping relation. For example, when the fog node scheduling request is received at a time and the resource information and related information of the corresponding fog nodes are acquired from the index server according to the fog node scheduling request, the server may cache the resource information and the related information of the corresponding fog nodes and establishes a mapping relation between the resource and the fog nodes with the resource according to the resource information and the resource information.

When receiving the fog node scheduling request initiated by the client, the server firstly searches the local cache for the corresponding resource information, and if the resource information corresponding to the fog node scheduling request is sought in the local cache, the candidate fog nodes with the resource requested by the fog node scheduling request are determined based on the resource information and the corresponding mapping relation. If no resource information corresponding to the fog node scheduling request is sought in the local cache, the inquiry request is generated according to the resource requested by the fog node scheduling request and sent to the index server, and accordingly, the index server searches for the corresponding resource information according to the inquiry request and then sends the resource information to the server. After acquiring the resource information, the server determines the candidate fog nodes with the resource requested by the fog node scheduling request according to the resource information and the corresponding mapping relation; or, the index server is continuously inquired for the candidate fog nodes with the resource identified in index information.

S204. Perform effectiveness filtration on the candidate fog nodes to obtain effective fog nodes.

The effective fog nodes refer to available fog nodes capable of communicating with the fog nodes. For example, if an Internet Protocol (IP) of the fog node is a normal address, and peer-to-peer (P2P) communication can be performed between the fog node and the client, it is to be shown that the fog node is the effective fog node.

In an embodiment, S204 may specifically include the following steps: Acquire network information of candidate fog nodes through a server. Filter the fog nodes corresponding to abnormal network information out of the candidate fog nodes. Filter the candidate fog nodes based on connectivity between the candidate fog nodes remaining after filtration and a client.

The network information may be network information of a network with the candidate fog nodes, such as a network type, a network speed and network stability. In addition, the network information may also be an IP address or port address of the candidate fog nodes. Connectivity may refer to whether P2P communication can be performed between the candidate fog nodes and the client.

Specifically, in the candidate fog nodes, the server filters out the fog nodes corresponding to private network IP addresses and abnormal IP addresses to obtain the candidate fog nodes remaining after filtration. Then, the server filters out the candidate fog nodes unable to perform P2P communication from the candidate fog nodes remaining after filtration so as to obtain the effective fog nodes. IP addresses of the effective fog nodes are normal, and P2P communication can be performed between the effective fog nodes and the client. The abnormal IP addresses include error IP addresses or empty IP addresses.

In an embodiment, before S204, steps include: Determine a network type of a network with candidate fog nodes, a supplier identification and a location through a server. Screen the effective fog nodes according to the network type, the supplier identification and the location to obtain the effective fog nodes remaining after screening.

The network type is used for identifying networks supplied by different network operators. The supplier identification is an identification of a supplier or a producer supplying or producing the fog nodes.

In an embodiment, after effective fog nodes are obtained, a server may screen the effective fog nodes by screening strategies including a fog node network operator screening strategy, a fog node supplier screening strategy and a fog node area screening strategy. Specifically, the server screens the effective fog nodes according to the fog node network operator screening strategy, namely, selecting one or more network types of effective fog nodes, for example, effective fog nodes in a telecom network or a unicom network or a mobile network are selected. Then, the server screens the effective fog nodes remaining after first-time screening according to the fog node supplier screening strategy, namely, screening the effective fog nodes supplied by different fog node suppliers, for example, there are fog node suppliers a-e each having the plurality of effective fog nodes, a fixed number of effective fog nodes may be selected from the effective fog nodes in each fog node supplier so as to balance a bandwidth proportion of each fog node supplier. Finally, the server screens the effective fog nodes remaining after second-time screening according to the fog node area screening strategy, namely screening the effective fog nodes in a specific area, for example, if a user is located in city a, the effective fog node closest to the user will be preferably selected.

S206. Acquire collected load information of the effective fog nodes.

The load information includes CPU information of the fog nodes, internal memory usage information of the fog nodes, upload bandwidth values of the fog nodes, etc.

In an embodiment, the fog nodes acquire the self load information in real time and then report the load information to an information acquisition server, the information acquisition server firstly sends the load information to an index server, then predicates the load information through a prediction algorithm to obtain a load information predicted value at next sampling time, and synchronously sends the load information predicted value the index server.

In an embodiment, when a server obtains effective fog nodes, whether load information of the effective fog nodes is locally cached or not is judged, if the load information of the effective fog nodes is cached, the load information of the effective fog nodes is acquired from a local cache; and if no load information of the effective fog nodes is cached, the index server is searched for the load information of the effective fog nodes. A searching manner may include: the server sends an inquiry request related to the load information of the effective fog nodes to the index server so that the index server can search for the load information of the effective fog nodes according to the load information, and then feed the sought load information back to the server.

In an embodiment, when locally-cached load information or load information stored by an index server are not newest load information, a server sends a load information inquiry request to the index server, then, the index server transmits the load information inquiry request to an information acquisition server, and accordingly the information acquisition server can acquire the newest load information from effective fog nodes after receiving the load information inquiry request.

S208. Perform scheduling in the effective fog nodes based on the load information to obtain a scheduling result. The scheduling result includes an identification of a target fog node obtained through scheduling and service flow allocated to the target fog node.

Scheduling may refer to selecting the corresponding target fog node from the effective fog nodes based on the load information and allocating corresponding service flow to the target fog node. The target fog node obtained through scheduling may be allocated to a client so as to perform a corresponding service. In addition, a scheduled target fog node is the above target fog node obtained through scheduling.

In an embodiment, S208 may specifically include the following steps: Rank effective fog nodes based on load information through a server to obtain an effective fog node sequence. Compute distribution probability of the fog nodes in the effective fog node sequence. Perform scheduling on the effective fog node sequence according to the distribution probability to obtain a scheduling result.

Specifically, when the load information includes CPU information of the fog nodes, a CPU occupation situation of the effective fog nodes may be determined according to the CPU information, and a target fog node needing to be scheduled is determined according to the CPU occupation situation; and/or when the load information includes internal memory usage information of the fog nodes, an internal memory occupation situation of the effective fog nodes may be determined according to the internal memory usage information, and the target fog node needing to be scheduled is determined according to the internal memory occupation situation; and/or when the load information includes upload bandwidth values of the fog nodes, the target fog node needing to be scheduled may be determined according to the upload bandwidth value. In addition, after the target node needing to be scheduled is determined, service flow allocated to the target fog node may be determined according to the load information.

For example, higher service flow is allocated to a target fog node with a high upload bandwidth value. Correspondingly, lower service flow is allocated to a target fog node with a low upload bandwidth value. For example, lower service flow is allocated to a target fog node with a high internal memory occupancy rate or CPU occupancy rate. Higher service flow is allocated to a target fog node with a low internal memory occupancy rate or CPU occupancy rate.

It is to be indicated that when the upload bandwidth value is less than a preset bandwidth value, corresponding effective fog nodes are not allocated to the client. When the internal memory occupancy rate or CPU occupancy rate is higher than a preset occupancy rate, corresponding effective fog nodes are not allocated to the client.

S210. Return the scheduling result to the client so that the client can acquire the resource from the target fog node according to the identification and the service flow.

In an embodiment, a server returns a scheduling result to a client so that the client can search for a corresponding target fog node according to an identification in the scheduling result and then acquires resources from the target fog node according to service flow. For example, assuming that there are target fog nodes a and b, an upload bandwidth value of the target fog node a is 100 Mbit/s, and an upload bandwidth value of the target fog node b is 50 Mbit/s, service flow allocated to the target fog node a may be twice as much as that allocated to the target fog node b, and if the service flow allocated to the target fog node a is 20 Mbit, the service flow allocated to the target fog node b is 10 Mbit, a 20 Mbit resource is acquired from the target fog node a, and a 10 Mbit resource is acquired from the target fog node a.

Figure 3:
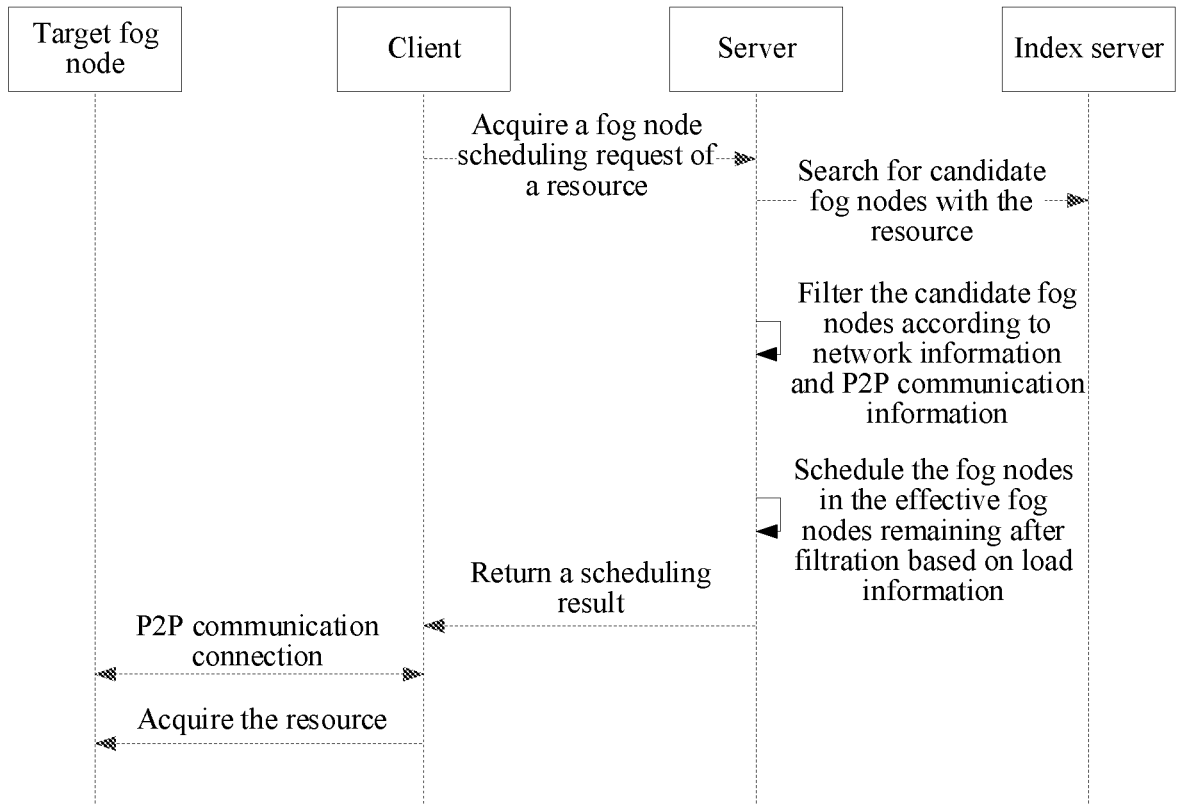
FIG. 3 is a schematic flowchart of a fog node scheduling method according to another embodiment.

To more clearly and visually know a solution of this application, the solution of this application is summarized in combination with FIG. 3, which is specifically shown as below: a client sends a fog node scheduling request for acquiring a resource to a server; the server searches for candidate fog nodes with the resource when receiving the fog node scheduling request, then filters the candidate fog nodes according to their respective network information and P2P connectivity, and then schedules effective fog nodes obtained after filtering according to load information, thereby determining a target fog node allocated to the client; and finally, a scheduling result is fed back to the client so that the client can determine the target fog node according to an identification in the scheduling result and perform P2P communication link, thereby acquiring the resource from the target fog node.

In the above embodiment, when the fog node scheduling request initiated by the client is received, the candidate fog nodes with the resource requested by the fog node scheduling request are sought and then subjected to effectiveness filtration so that the effective fog nodes can be obtained, and the scheduled fog nodes are ensured to be available effective fog nodes. In addition, the scheduled fog nodes are ensured to have load capacity by obtaining the load information of the effective fog nodes and obtaining the scheduling result through scheduling in the effective fog nodes based on the load information, and accordingly, a user can obtain the available fog nodes with the load capacity. The scheduling result is fed back to the client so that the client can acquire the resource from the target fog node according to the identification in the scheduling result and the service flow, and since all the scheduled fog nodes are available and have load capacity, the service for the user can be ensured to be reliably and stably proceeded when the client acquires the resource, and service reliability and stability are improved.

Figure 4:
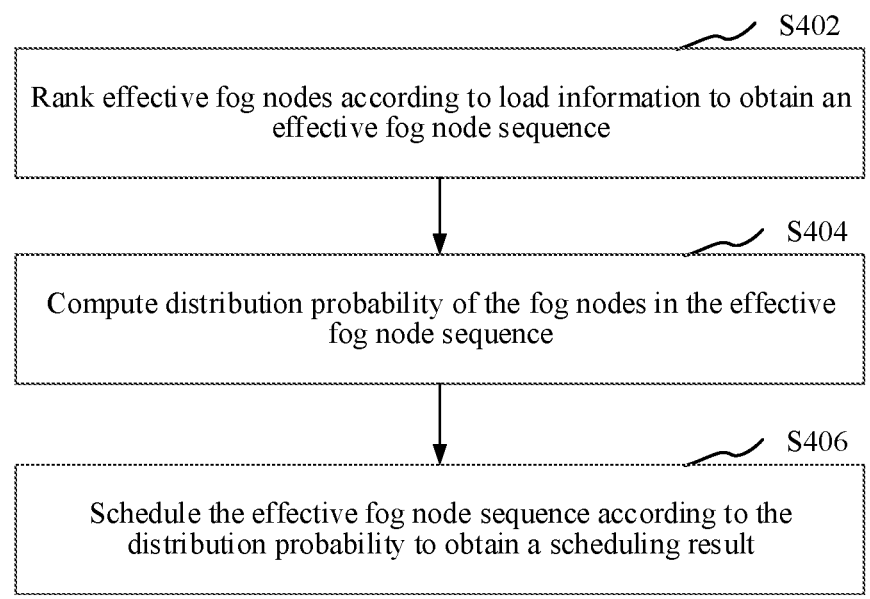
FIG. 4 is a schematic flowchart of performing a fog node scheduling step according to distribution probability computed according to an embodiment.

In an embodiment, as shown in FIG. 4, S210 may specifically include the following steps:

S402. Rank effective fog nodes according to load information to obtain an effective fog node sequence.

The effective fog node sequence is an ordered sequence obtained after ranking the effective fog nodes.

In an embodiment, load information includes an upload_capacity; and a server computes a weight of each effective fog node based on the upload_capacity, selects a variable value within a preset section, computes a characteristic value of each effective fog node according to the weight and the variable value, and ranks the effective fog nodes according to the characteristic values.

The upload_capacity can refer to an upload bandwidth capacity value (Kbit/s) of the effective fog nodes.

In an embodiment, a server acquires preset parameters and makes a ratio of an upload_capacity to the preset parameters as a weight of effective fog nodes; or, the server acquires a weight coefficient and makes a product of the weight coefficient and the upload_capacity as the weight of the effective fog nodes.

For example, effective fog node characteristic value computing and ranking manners are as follow:

1) Characteristic value computing

The weight of each effective fog node is computed according to the upload bandwidth capacity value, and a computational formula: weight=upload_capacity/45000; and a random variable X is acquired from a section [0,1], namely X∈U(0,1), a characteristic value m of each effective fog node is computed, and a computational formula weight of m: $m = \sqrt[weight]{X}$.

2) Ranking manner

After the characteristic values m of all the effective fog nodes are computed, the effective fog nodes are ranked according to the characteristic values m from high to low, and an effective fog node sequence L ranking according to the characteristic values m from high to low is obtained.

S404. Compute distribution probability of the fog nodes in the effective fog node sequence.

The distribution probability may refer to scheduled probability of the fog nodes in the effective fog node sequence, namely probability of allocating the fog nodes to the client to perform corresponding services.

In an embodiment, when load information includes an upload_capacity and a real-time upload bandwidth value, a server acquires initial distribution probability of each fog node in an effective fog node sequence; a real-time bandwidth usage ratio of each fog node in the effective fog node sequence is computed based on the upload_capacity and the real-time upload bandwidth value; and distribution probability of each fog node in the effective fog node sequence is computed according to the initial distribution probability, the real-time bandwidth usage ratio and target probability parameters.

The real-time upload bandwidth value may refer to a real-time upload bandwidth value of each effective fog node, namely, a real-time upload rate of each effective fog node. The real-time bandwidth usage ratio may refer to a real-time bandwidth usage ratio of each effective fog node and is in positive correlation to the real-time upload bandwidth value, namely, the higher the real-time bandwidth value, the higher the real-time bandwidth usage ratio becomes. The target probability parameters may be influence factors during distribution probability calculation and are affected by the real-time bandwidth usage ratio.

Specifically, the server may make a ratio of the upload_capacity to the real-time upload bandwidth value as the real-time bandwidth usage ratio.

In an embodiment, a step of computing distribution probability specifically may include the following steps: Input initial distribution probability, a real-time bandwidth usage ratio and a target probability parameter into a distribution probability computational formula through a server and compute distribution probability of fog nodes in an effective fog node sequence according to the distribution probability computational formula. The distribution probability computational formula:

$$p = \frac{p_0}{(1-p_0)e^{k \times \eta} + p_0}$$

p0 represents the initial distribution probability, k represents the target probability parameter, and η represents the real-time bandwidth usage ratio. A default value of the initial distribution probability p0 may be set according to actual situations, and may be set as 0.9. A target probability parameter k is maintained for each line of the fog nodes and may be adjusted in real time according to the bandwidth usage ratio.

1) A single-line scenario

In an embodiment, when fog nodes in an effective fog node sequence are single-line fog nodes, distribution probability computing steps include: Compute real-time bandwidth usage ratios of the single-line fog nodes based on an upload_capacity and a real-time upload bandwidth value through a server, and compute distribution probability of the fog nodes in the effective fog node sequence according to the real-time bandwidth usage ratio, the initial distribution probability and target probability parameters. The above distribution probability computational formula may be utilized for computing the distribution probability of the fog nodes in the effective fog node sequence.

For example, in the single-line scenario, namely when the fog nodes in the effective fog node sequence are the single-line fog nodes, a computational formula of the real-time upload bandwidth usage ratio of each fog node in the effective fog node sequence: η=(a real-time upload bandwidth value of each fog node)/(an upload_capacity value of each fog node), and the real-time upload bandwidth usage ratio η is inputted into the distribution probability computational formula to obtain the distribution probability p.

2) A multi-line aggregated scenario

In an embodiment, when fog nodes in an effective fog node sequence are multi-line aggregated fog nodes, a server sequentially selects at least two lines from lines corresponding to the multi-line aggregated fog nodes, respectively computes real-time bandwidth usage ratios of the at least two lines, and makes the maximum real-time bandwidth usage ratio as the real-time bandwidth usage ratio corresponding to the multi-line aggregated fog nodes.

For example, two lines are randomly selected from all lines of the multi-line aggregated fog nodes firstly. Assuming that a line1 and a line2 are selected, upload bandwidth usage ratios: η1=(a real-time upload bandwidth value of the fog node line1)/(an upload_capacity of the fog node line1) and η2=(a real-time upload bandwidth value of the fog node line2)/(an upload_capacity of the fog node line2) of the two lines are computed correspondingly. A target probability parameter k1 of the fog node line1 and a target probability parameter k2 of the line2 are inputted into the distribution probability computational formula of the fog nodes to compute distribution probability of the two lines, and the distribution probability computational formula is as below:

$$p_1 = \frac{p_0}{\left((1-p_0)e^{k_1 \times \eta_1} + p_0\right)}$$

$$p_2 = \frac{p_0}{\left((1-p_0)e^{k_2 \times \eta_2} + p_0\right)}$$

The line with the maximum probability is selected from the line1 and the line2 to represent the fog node. If p1>p2, the line1 is selected for representing the fog node at the time; and meanwhile, the distribution probability p1 of the line1 serves as the distribution probability of the fog node and accordingly serves as a basis for node scheduling.

It is mentioned that a target probability parameter is maintained for each line of the fog nodes above, and a maintaining manner for the target probability parameters includes the specific steps: Acquire bandwidth usage ratios of the fog nodes in the effective fog node sequence within a target historical time period. Compute a bandwidth usage ratio predicted value at next sampling time based on each bandwidth usage ratio. Obtain the target probability parameters according to the bandwidth usage ratio predicted values and adjustment on initial probability parameters by an adjustment factor.

For example, an upload bandwidth usage ratio predicted value η' at next sampling time is computed through a least square method according to line upload bandwidth usage ratios one minute ago. Whether the initial probability parameters need to be adjusted or not is judged according to the predicted value η', and if adjustment is needed, the initial probability parameters are adjusted according to the adjustment factor.

The adjustment factor is composed of an adjustment step and an adjustment coefficient, and the adjustment step is equal to 0.01 and may be other values. Different predicted values η' correspond to different adjustment coefficients. For example, an adjustment process is as below: assuming that the initial probability parameter is k0, when the predicted value η' is less than a threshold a, the target probability parameter k=k0-0.01t1, and t1 is an adjustment coefficient when the predicted value η'is less than the threshold a; and when the predicted value η' is greater than a threshold b, the target probability parameter k=k0+0.01t2, and t2 is an adjustment coefficient when the predicted value η' is greater than the threshold b.

S406. Perform scheduling on the effective fog node sequence according to the distribution probability to obtain a scheduling result.

The effective fog nodes with the high distribution probability have the higher probability of being allocated to the client.

In an embodiment, a server sequentially schedules an effective fog node sequence according to distribution probability from high to low, and when the number of the scheduled fog nodes reaches the number of scheduled and configured nodes, service flow is allocated to each scheduled target fog node based on the distribution probability or weights or characteristic values of the fog nodes.

As an example, a server computes a corresponding weight according to an upload bandwidth capacity value of each effective fog node, then selects a random variable X in a section [0,1], computes a characteristic value m of each effective fog node, and ranks the effective fog nodes according to the characteristic values m to obtain an effective fog node sequence L; and distribution probability p of each effective fog node is computed according to the effective fog node sequence L, and whether the effective fog nodes need to be allocated or not is judged according to the distribution probability p. For example, if the distribution probability p of a certain effective fog node a is 0.61 at present, the effective fog node a has 61% chance of being selected out. When the selected effective fog nodes conform to the number of the scheduled and configured nodes, a scheduling process is stopped, and the selected nodes serve as a scheduling result to be sent back to the client, thereby finishing the whole scheduling process.

In the above embodiment, after the effective fog nodes are ranked based on the characteristic values of the effective fog nodes to obtain the effective fog node sequence, the distribution probability of the fog nodes in the effective fog node sequence is computed, then, the effective fog node sequence is scheduled according to the distribution probability so as to ensure that all the scheduled target fog nodes have load capacity so that the user can obtain the available fog nodes with the load capacity, and when the client acquires the resources, reliable and stable proceeding of the service for the user can be ensured, and service reliability and stability are improved. In addition, during distribution probability calculation, the target probability parameters are adopted for calculation and change along with the bandwidth usage ratio predicted values so that the computed distribution probability can be matched with the current upload bandwidth value, namely the higher the upload bandwidth value, the higher the distribution probability is, then, the probability of allocating the corresponding effective fog nodes to the client is higher, accordingly, the fog node allocation effect is improved, and the fog node usage ratio is increased.

Figure 5:
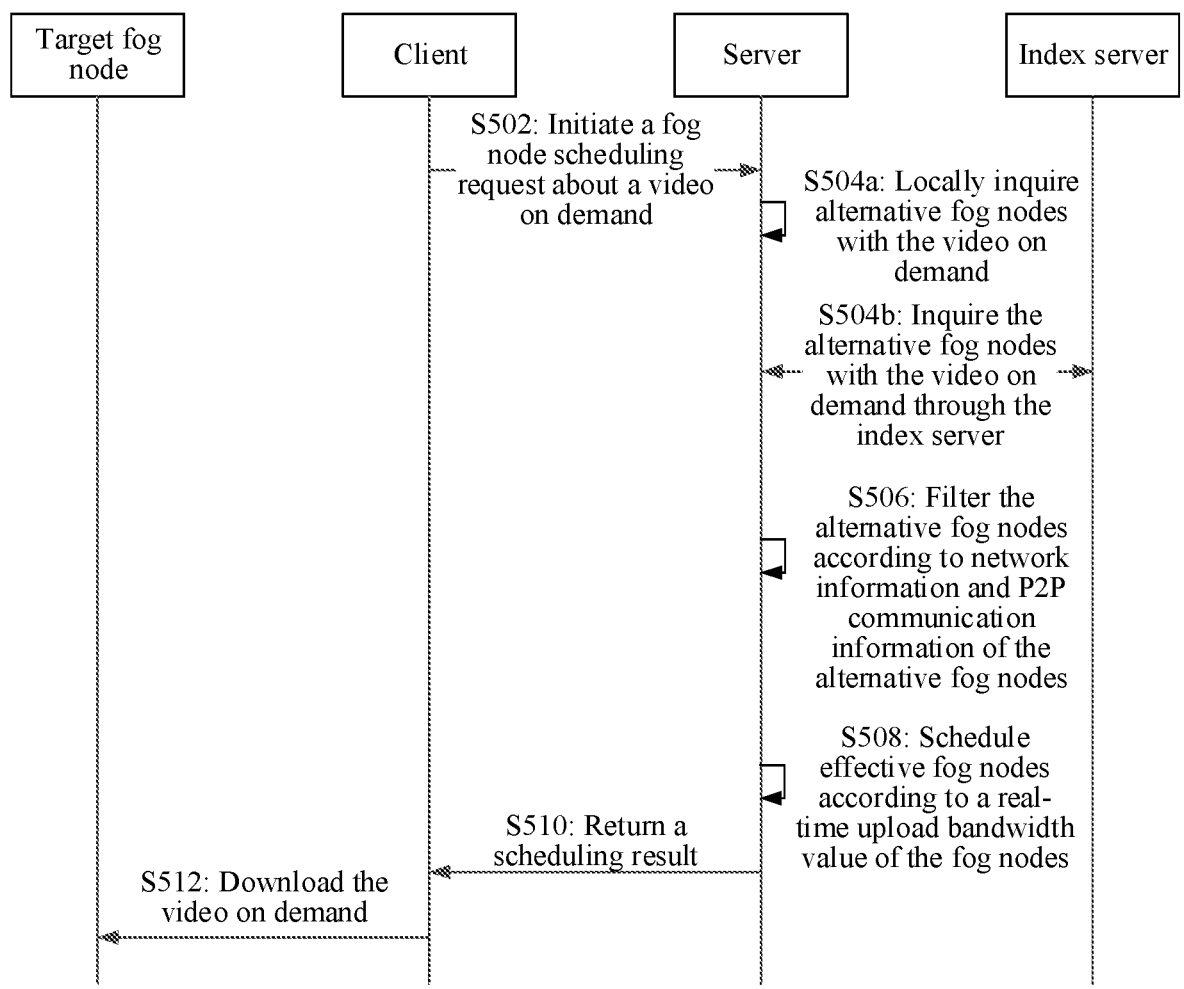
FIG. 5 is a schematic flowchart of downloading a video on demand through a fog node scheduling method according to an embodiment.

This application further provides a video-on-demand application scenario applying the above fog node scheduling method. As shown in FIG. 5, application of the fog node scheduling method to the application scenario is as below:

S502. Initiate a video-on-demand fog node scheduling request to a server through a client.

The server is a scheduling server.

S504a. Locally inquire candidate fog nodes with videos on demand through the server when video information related to the videos on demand, related information of fog nodes and a mapping relation between the videos and the fog nodes are locally cached.

S504b. Enable an index server to inquire candidate fog nodes with the videos on demand through the server when the video information related to the videos on demand, the related information of the fog nodes and the mapping relation between the videos and the fog nodes are not locally cached.

S506. Filter the candidate fog nodes through the server according to network information and P2P communication information of the candidate fog nodes to obtain effective fog nodes.

S508. Schedule the effective fog nodes through the server according to real-time upload bandwidth values of the fog nodes to obtain a scheduling result.

S510. Feed the scheduling result back to the client through the server.

S512. Download demand data from scheduled target fog nodes through the client according to the scheduling result.

Different target fog nodes correspond to different service flows if the real-time upload bandwidth values are different.

Figure 6:
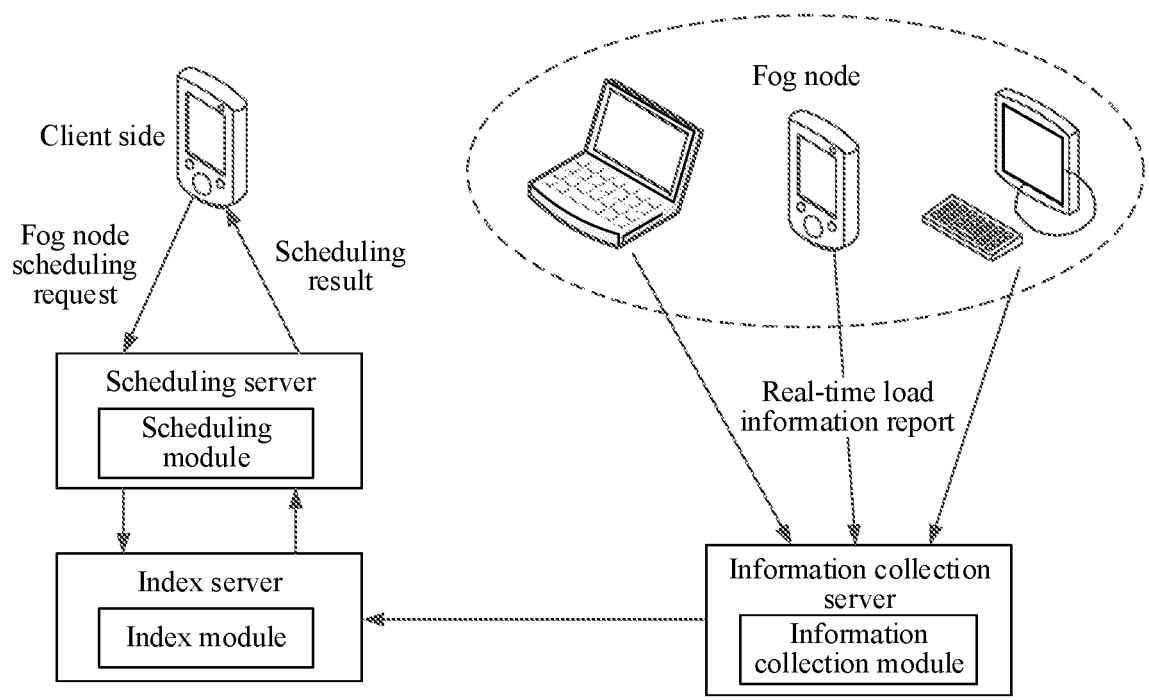
FIG. 6 is a structural block diagram of a fog node scheduling system according to an embodiment.

As shown in FIG. 6, this application further provides a fog node scheduling system composed of a client, a fog node, a scheduling server, an index server and an information acquisition server. The scheduling server is provided with a scheduling module, the index server is provided with an index module, and the information acquisition server is provided with a fog node information collection module.

A working principle of the system is as below: heartbeat communication is periodically performed between the fog node and the information collection module, and real-time load information is periodically reported to the information collection module. The information collection module synchronously sends the load information to the index module after collecting the load information of the fog node. When the client initiates a fog node scheduling request, the scheduling module inquires the index module for a resource requested at present, obtains all fog nodes with the resource, and makes a reasonable fog node scheduling decision according to their respective fog node P2P connectivity, network information and the load information.

Then, the scheduling module, the index module and the information collection module are respectively described:

(1) Information collection module

The information collection module is configured to collect the real-time load information of the fog node.

The fog node periodically reports self real-time information, and specific reported information includes fog node ID, an equipment supplier of the fog node, a memory usage situation of the fog node, an internal memory usage situation of the fog node, an upload bandwidth of the fog node and other real-time information. For PCDN, a real-time upload bandwidth value on each network line on the fog node is mostly focused at present and is processed through a least square method to compute an upload bandwidth predicted value at next sampling time, and the upload bandwidth predicted value is synchronously sent to the index module.

(2) Index module

All resource information in fog computing service are stored in the index module and includes a resource file name, a resource ID, a resource file size, a file check code, etc.; and in addition, related information of all on-line fog nodes is further stored and includes equipment information of the fog nodes, network information, load information, etc.

The index module further maintains a mapping relation between the resource and the fog nodes, and thus for a file1 of a certain resource, the scheduling module can inquire the fog nodes with the file1 of the resource, thereby rapidly determining a range for current fog node scheduling.

(3) Scheduling module

The scheduling module includes following parts: 1) a message processing module configured to receive, send and process the fog node scheduling request and perform reply; 2) a local cache module locally caching the inquired resource information and part of information of the fog nodes so as to reduce a load of the index module, where, the part of information is the equipment information of the fog nodes and the network information; and 3) a scheduling logic module for selecting and scheduling the fog nodes.

After receiving the fog node scheduling request, the scheduling module firstly checks whether the resource assigned by the current fog node scheduling request hits a local cache or not; and if the resource requested by the current fog node scheduling request does not hit the local cache, an inquiry request related to the resource information is initiated to the index module, and after the resource information is inquired, the index module is inquired about related information of the fog nodes with the resource. After two-time inquiry, the scheduling module organizes two-time inquiry results, establishes the mapping relation between the resource and the fog nodes and caches the mapping relation in the local cache module. After the resource requested by the current fog node scheduling request hits the local cache, needed information is directly read from the local cache for scheduling decision making.

After the resource information is acquired, the scheduling logic module performs preliminary screening on the fog nodes according to a current scheduling decision making rule. During preliminary fog node screening, the candidate fog nodes with the resource are screened according to a fog node network operator screening strategy, a fog node supplier screening strategy, a fog node area screening strategy to obtain a primary selection result of the fog nodes.

The scheduling logic module filters the primary selection result of the fog nodes to remove the unusable fog nodes. When the fog nodes are filtered, whether equipment information and network information of the current filtered candidate fog nodes need to be updated or not is checked, and newest equipment information and network information are called from the index module for the candidate fog nodes with the information needing to be updated.

During filtering operation, the fog nodes unable to perform P2P communication with the client are filtered out of all the candidate fog nodes, in addition, the fog nodes with abnormal network information are filtered out, and then the remaining candidate fog nodes are effective fog nodes.

After the filtering operation, the scheduling logic module performs scheduling decision making on the effective fog nodes remaining after filtering according to real-time load information to obtain a final scheduling result. Before scheduling, whether the real-time load information of the effective fog nodes is newest information or not is checked firstly, and if updating is needed, the newest real-time load information is called from the index module.

The scheduling logic module makes a final fog node scheduling decision according to the real-time load information of the effective fog nodes. In the scheduling process, a characteristic value of each effective fog node is computed firstly, and specific steps for computing the characteristic values include:

1) Compute a weight of each effective fog node according to an upload_capacity (kbit/s) of each effective fog node, where a computational formula: weight=upload_capacity/45000.

2) Select a random variable X from a section [0,1], namely X∈U(0,1) and compute the characteristic value m of each effective fog node, where a computational formula of the characteristic value m: $m = {}^{weight}\sqrt{X}$.

After the characteristic values m of all the effective fog nodes are computed, the effective fog nodes are ranked according to the characteristic values m from high to low, thereby obtaining an effective fog node sequence L.

Distribution probability p of each effective fog node is computed according to the effective fog node sequence L, and whether the effective fog nodes need to be allocated or not is judged according to the distribution probability. For example, if the distribution probability p of a certain effective fog node is 0.61 at present, the effective fog node has 61% chance of being allocated. When the allocated fog nodes conform to the number of scheduled and configured nodes, a scheduling process is stopped, and the selected effective fog nodes serve as a scheduling result to be sent back to the client. The effective fog nodes selected according to the distribution probability p are the target fog nodes in the above embodiment.

For distribution probability calculation, there are two types of fog nodes including single-line fog nodes and multi-line aggregated fog nodes in a current fog computing service. A distribution probability computational formula of the fog nodes:

$$p = \frac{p_0}{(1-p_0)e^{k \times \eta} + p_0}$$

p0 is initial distribution probability of the target fog nodes and is 0.9 as default; k is a probability parameter, and k is maintained for each line of the fog nodes and may be adjusted in real time; and η is a current upload bandwidth usage ratio of the fog nodes, and calculation modes are different for two kinds of different fog nodes.

For distribution probability calculation, the scheduling logic module may sequentially compute the distribution probability p of each fog node according to the effective fog node sequence L. For different types of fog nodes, there are two calculation modes:

1) Single-line fog nodes

For the single-line fog nodes, an upload bandwidth usage ratio η of the single-line fog nodes may be computed according to a computational formula: η=(a real-time upload bandwidth value of each fog node)/(an upload_capacity value of each fog node).

2) Multi-line aggregated fog nodes

Firstly, two lines are randomly selected as alternatives from all lines of the fog nodes. Assuming that a line1 and a line2 are randomly selected, upload bandwidth usage ratios: η1=(a real-time upload bandwidth value of the fog node line1)/(an upload_capacity of the fog node line1) and η2=(a real-time upload bandwidth value of the fog node line2)/(an upload_capacity of the fog node line2) of the two lines are computed correspondingly. The distribution probability of the two lines may be computed by inputting a probability parameter k1 of the line1 and a probability parameter k2 of the line2 into the distribution probability computational formula of the fog nodes, and the distribution probability computational formula:

$$p_1 = \frac{p_0}{\left((1-p_0)e^{k_1 \times \eta_1} + p_0\right)}$$

$$p_2 = \frac{p_0}{\left((1-p_0)e^{k_2 \times \eta_2} + p_0\right)}$$

Then, the line with the higher probability is selected to represent the effective fog node. If p1>p2, the line1 is selected for representing the effective fog node at the time; and meanwhile, the distribution probability p1 of the line1 serves as the distribution probability of the fog node and accordingly serves as a basis for node scheduling.

Probability parameter maintenance or adjustment: a probability parameter k is maintained for each line of the fog nodes and may be adjusted in real time. In other words, the scheduling module maintains a real-time probability parameter k for each network line, where k is a nonnegative number. A probability parameter adjusting algorithm is as below:

1) An upload bandwidth usage ratio predicted value η' at next sampling time is computed through a least square method according to upload bandwidth usage ratios of the lines one minute ago. Whether initial probability parameters need to be adjusted or not is judged according to the predicted value η', where an adjustment step is equal to 0.01.

2) Assuming that the initial probability parameter is k0, a probability parameter adjusting process is as below:
when η'<60%, k=k0−35×0.01;
when 60%<η'<75%, k=k0−5×0.01;
when 75%<η'<95%, k=k0−0.01;
when 95%<η'<105%, k is not changed;
when 105%<η'<125%, k=k0+0.01;
when 125%<η'<150%, k=k0+5×0.01; and
When η'>150%, k=k0+10×0.01.

Figure 7:
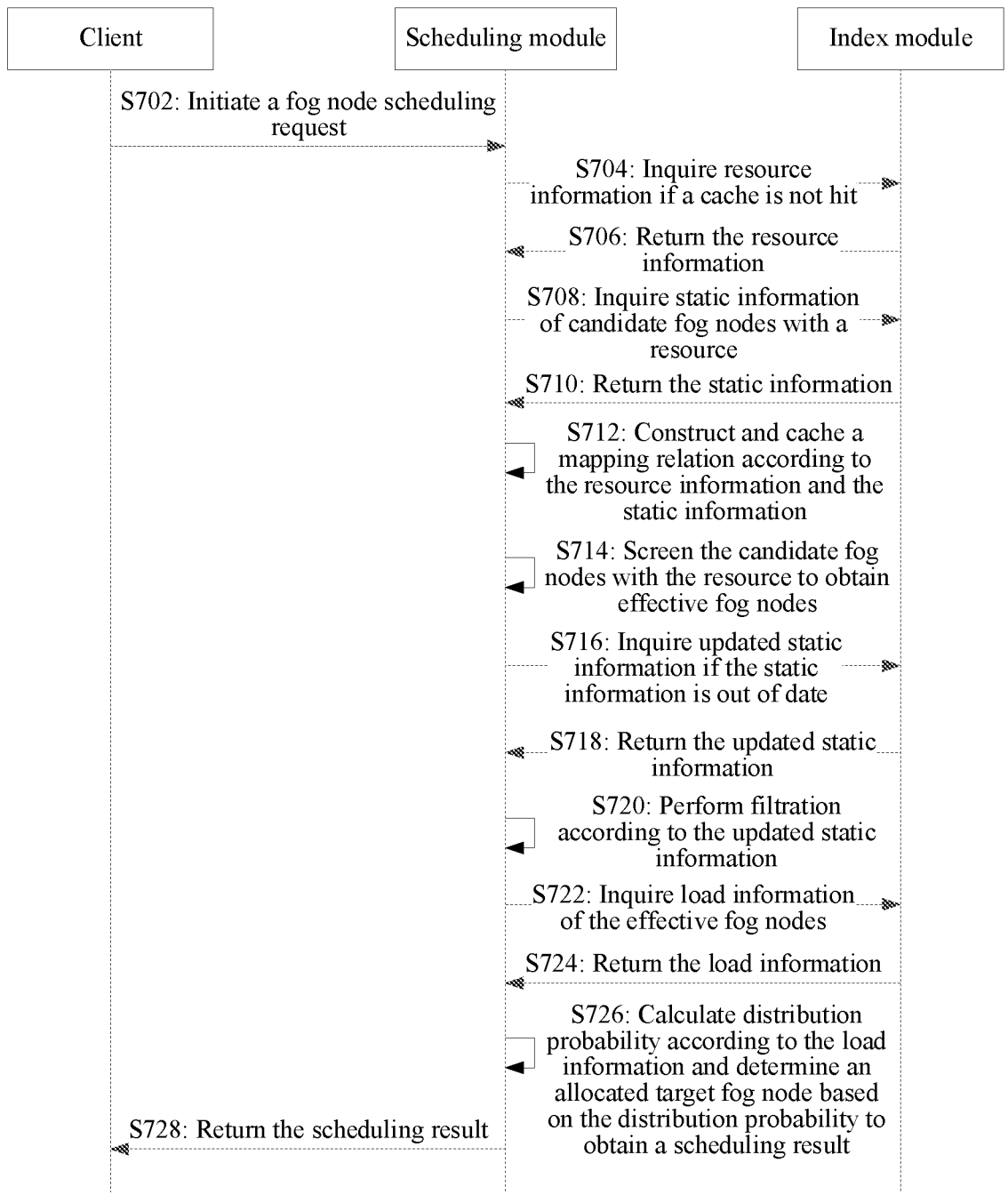
FIG. 7 is a schematic flowchart of a fog node scheduling method according to another embodiment.

As an example, for a fog node scheduling process, refer to FIG. 7, and the specific steps are as below:

S702. Send a fog node scheduling request to a scheduling module through a client.

S704. Judge whether a cache is hit or not when the scheduling module receives the fog node scheduling request. If the cache is not hit, an index module is inquired about resource information.

S706. Return the resource information through the index module.

The fog nodes with a resource requested by the fog node scheduling request can be determined according to the resource information.

S708. Inquire static information of candidate fog nodes with the resource through the scheduling module.

The static information refers to network information of the candidate fog nodes and P2P communication information with the client.

S710. Return the static information of the candidate fog nodes through the index module.

S712. Construct and cache a mapping relation according to the resource information and the static information through the scheduling module.

S714. Screen the candidate fog nodes with the resource to obtain effective fog nodes through the scheduling module.

S716. Inquire updated static information through the scheduling module if the static information is out of date.

S718. Return the updated static information through the index module.

S720. Perform filtering according to the updated static information through the scheduling module.

S722. Acquire load information of the effective fog nodes through the scheduling module.

S724. Return the load information through the index module.

S726. Compute distribution probability according to the load information through the scheduling module, determine allocated target fog nodes based on the distribution probability and obtain a scheduling result.

S728. Return the scheduling result through the scheduling module so as to acquire the resource from the target fog nodes according to the scheduling result.

Through a solution of the above scheme, fog computing service reliability and usability can be improved on a scheduling side, and meanwhile the usage ratio of the fog nodes is improved as much as possible by guaranteeing that the fog nodes are not overloaded.

It is to be understood that, although the steps in the flowcharts of FIG. 2, FIG. 4, FIG. 5, and FIG. 7 are sequentially displayed according to indication of arrows, the steps are not necessarily sequentially performed in the sequence indicated by the arrows. Unless clearly specified in this specification, there is no strict sequence limitation on the execution of the steps, and the steps may be performed in another sequence. Moreover, at least some of the steps in FIG. 2, FIG. 4, and FIG. 5 to FIG. 7 may include a plurality of steps or a plurality of stages. These steps or stages are not necessarily performed at the same moment, but may be performed at different times. These steps or stages are not necessarily executed sequentially, but may be performed with at least one part of the other steps or steps of other steps or stages in turn.

Figure 8:
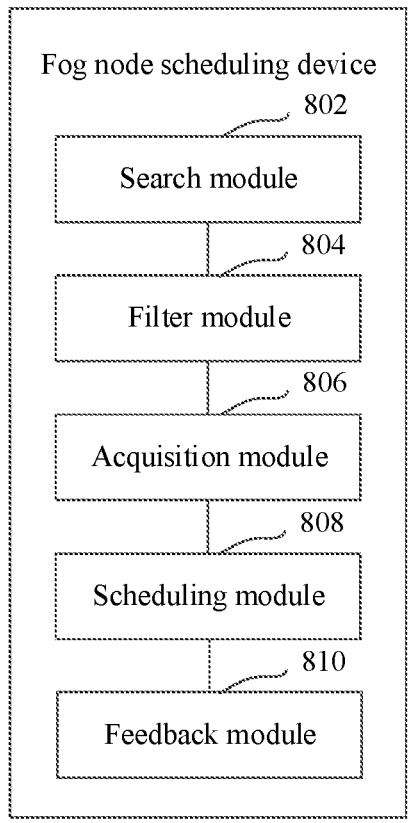
FIG. 8 is a structural block diagram of a fog node scheduling apparatus according to an embodiment.

In an embodiment, as shown in FIG. 8, a fog node scheduling apparatus is provided and may adopt a software module or hardware module or combination of the software module and the hardware module to become a part of a computer device, and the apparatus specifically includes: a search module 802, a filter module 804, an acquisition module 806, a scheduling module 808 and a feedback module 810, where the search module 802 is configured to search for candidate fog nodes storing a resource requested by a fog node scheduling request when the fog node scheduling request initiated by a client is received;

the filter module 804 is configured to perform effectiveness filtration on the candidate fog nodes to obtain effective fog nodes;

the acquisition module 806 is configured to acquire collected load information of the effective fog nodes;

the scheduling module 808 is configured to perform scheduling in the effective fog nodes based on the load information to obtain a scheduling result, and the scheduling result includes an identification of a target fog node obtained through scheduling and service flow allocated to the target fog node; and the feedback module 810 is configured to return the scheduling result to the client so that the client can acquire the resource from the target fog node according to the identification and the service flow.

In an embodiment, a search module 802 is further configured to acquire resource information of a resource requested by a fog node scheduling request, and search for mapped fog node information with the resource information as an index based on a pre-stored mapping relation from resource information to fog node information to obtain candidate fog nodes.

In an embodiment, a search module 802 is further configured to acquire locally-cached resource information according to a fog node scheduling request when the resource information corresponding to the fog node scheduling request is locally cached, send an inquiry request to an index server when no resource information corresponding to the fog node scheduling request is locally cached, thereby enabling the index server to inquire the resource information corresponding to the resource based on the inquiry request, and receive the resource information fed back by the index server.

Figure 9:
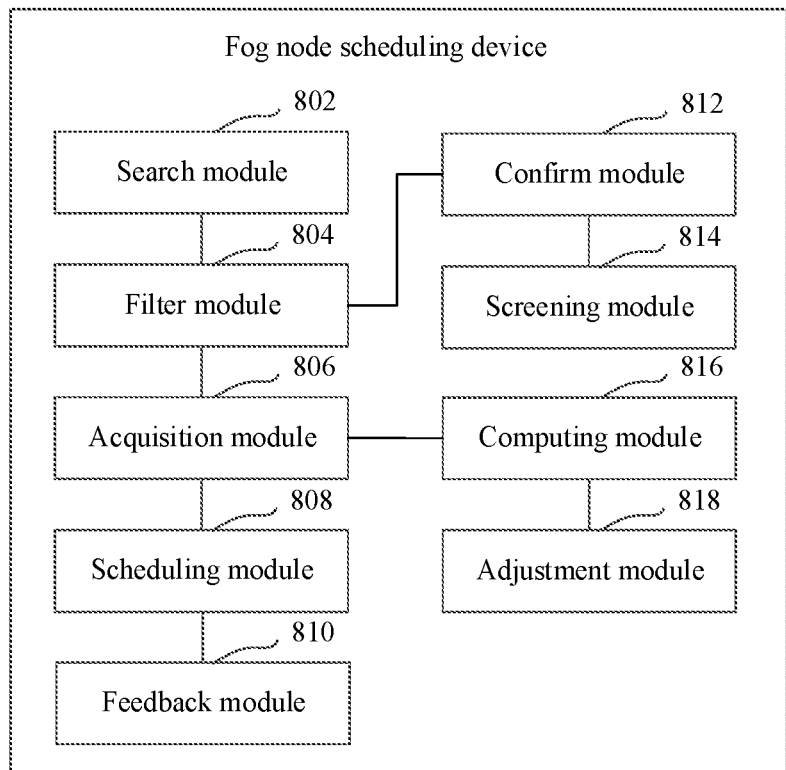
FIG. 9 is a structural block diagram of a fog node scheduling apparatus according to another embodiment.

In an embodiment, as shown in FIG. 9, the apparatus further includes:

a confirm module 812 configured to determine a network type of a network with candidate fog nodes, a supplier identification and a location before effectiveness filtration is performed on the candidate fog nodes to obtain effective fog nodes; and a screening module 814 configured to screen the effective fog nodes according to the network type, the supplier identification and the location to obtain the effective fog nodes remaining after screening.

In an embodiment, a filter module 804 is further configured to acquire network information of candidate fog nodes, filter fog nodes corresponding to abnormal network information out of the candidate fog nodes, and filter the candidate fog nodes based on connectivity between the candidate fog nodes remaining after filtration and a client.

In the above embodiment, when a fog node scheduling request initiated by the client is received, the candidate fog nodes with a resource requested by the fog node scheduling request are sought and then subjected to effectiveness filtration so that the effective fog nodes can be obtained, and the scheduled fog nodes are ensured to be available effective fog nodes. In addition, the scheduled fog nodes are ensured to have load capacity by obtaining load information of the effective fog nodes and obtaining a scheduling result through scheduling in the effective fog nodes based on the load information, and accordingly, a user can obtain the available fog nodes with the load capacity. The scheduling result is fed back to the client so that the client can acquire the resource from a target fog node according to the identification in the scheduling result and the service flow, and since all the scheduled fog nodes are available and have load capacity, the service for the user can be ensured to be reliably and stably proceeded when the client acquires the resource, and service reliability and stability are improved.

In an embodiment, a scheduling module 808 is further configured to rank effective fog nodes according to load information to obtain an effective fog node sequence, compute distribution probability of the fog nodes in the effective fog node sequence, and perform scheduling on the effective fog node sequence according to the distribution probability to obtain a scheduling result.

In an embodiment, a scheduling module 808 is further configured to compute a weight of each effective fog node based on upload_capacity, select a variable value in a preset section, compute a characteristic value of each effective fog node according to the weight and the variable value, and rank the effective fog nodes according to the characteristic values.

In an embodiment, load information includes an upload_capacity and a real-time upload bandwidth value; and a scheduling module 808 is further configured to acquire initial distribution probability of fog nodes in an effective fog node sequence, a real-time bandwidth usage ratio of each fog node in the effective fog node sequence is computed based on the upload_capacity and the real-time upload bandwidth value; and distribution probability of each fog node in the effective fog node sequence is computed according to the initial distribution probability, the real-time bandwidth usage ratio and target probability parameters.

In an embodiment, a scheduling module 808 is further configured to input initial distribution probability, a real-time bandwidth usage ratio and a target probability parameter into a distribution probability computational formula and compute distribution probability of fog nodes in an effective fog node sequence according to the distribution probability computational formula. The distribution probability computational formula:

$$p = \frac{p0}{(1-p0)e^{k \times \eta} + p0}$$

p0 represents the initial distribution probability, k represents the target probability parameter, and η represents the real-time bandwidth usage ratio.

In an embodiment, as shown in FIG. 9, the apparatus further includes:
  an acquisition module 806 further configured to acquire bandwidth usage ratios of fog nodes in an effective fog node sequence within a target historical time period;
  a computing module 816 configured to compute a bandwidth usage ratio predicted value at next sampling time based on each bandwidth usage ratio; and
  an adjustment module 818 configured to obtain target probability parameters according to the bandwidth usage ratio predicted values and adjustment on initial probability parameters by an adjustment factor.

In an embodiment, a scheduling module 808 is further configured to compute a real-time bandwidth usage ratio of each single-line fog node based on an upload_capacity and a real-time upload bandwidth value when fog nodes in an effective fog node sequence are the single-line fog nodes, sequentially select at least two lines from lines corresponding to multi-line aggregated fog nodes when fog nodes in the effective fog node sequence are the multi-line aggregated fog nodes, respectively compute real-time bandwidth usage ratios of the at least two lines, and make the maximum real-time bandwidth usage ratio as the real-time bandwidth usage ratio corresponding to the multi-line aggregated fog nodes.

In the above embodiment, after the effective fog nodes are ranked based on the characteristic values of the effective fog nodes to obtain the effective fog node sequence, the distribution probability of the fog nodes in the effective fog node sequence is computed. Then the effective fog node sequence is scheduled according to the distribution probability so as to ensure that all the scheduled target fog nodes have load capacity so that the user can obtain the available fog nodes with the load capacity. Furthermore, when the client acquires the resources, reliable and stable proceeding of the service for the user can be ensured, and service reliability and stability are improved. In addition, during distribution probability calculation, the target probability parameters are adopted for calculation and change along with the bandwidth usage ratio predicted values so that the computed distribution probability can be matched with the current upload bandwidth value, namely the higher the upload bandwidth value, the higher the distribution probability is, then, the probability of allocating the corresponding effective fog nodes to the client is higher, accordingly, the fog node allocation effect is improved, and the fog node usage ratio is increased.

For a specific limitation on a fog node scheduling apparatus, refer to the limitation on the fog node scheduling method above. Details are not described herein again. Each module in the fog node scheduling apparatus may be implemented in whole or in part by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a server, and an internal structure diagram thereof may be shown in FIG. 10. The computer device includes a processor, a memory, and a network interface connected through a system bus. The processor of the computer device is configured to provide computing and control capabilities. The memory of the computer device includes a non-volatile storage medium and an internal memory. The non-volatile storage medium stores an operating system, computer-readable instructions, and a database. The internal memory provides an environment for running of the operating system and the computer-readable instructions in the non-volatile storage medium. A database of a computer device is configured to store load information, network information and resource information. The network interface of the terminal is configured to communicate with an external terminal through a network connection. A computer readable instruction is executed by a processor so as to achieve the fog node scheduling method.

Figure 10:
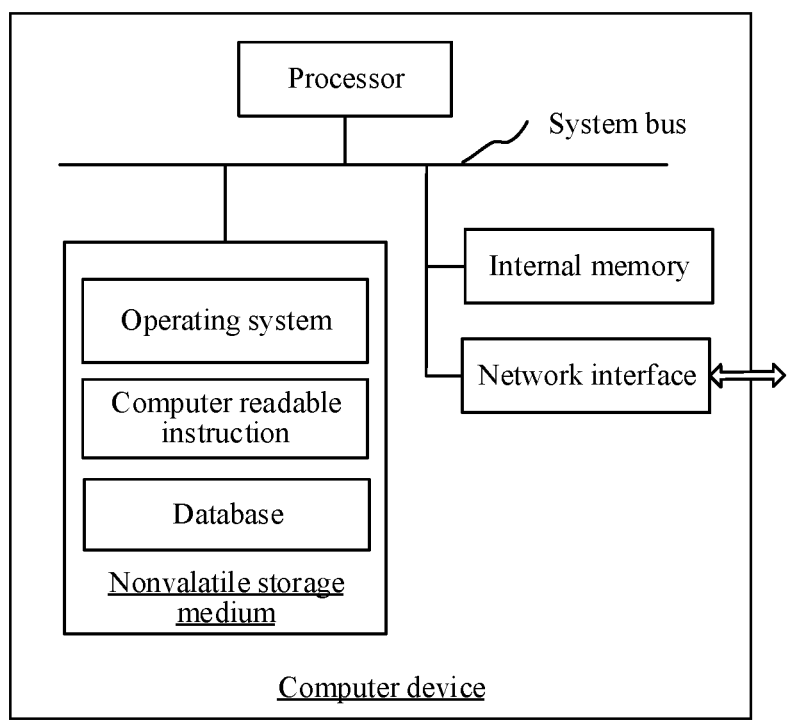
FIG. 10 is a diagram of an internal structure of a computer device in an embodiment.

A person skilled in the art may understand that, the structure shown in FIG. 10 is only a block diagram of a part of a structure related to a solution of this application and does not limit the computer device to which the solution of this application is applied. Specifically, the computer device may include more or fewer members than those in the drawings, or include a combination of some members, or include different member layouts.

In an embodiment, a computer device is provided, including a memory and a processor, the memory storing computer-readable instructions, the processor, when executing the computer-readable instructions, implementing the steps in the foregoing method embodiments.

In an embodiment, a computer-readable storage medium is provided, storing computer-readable instructions, the computer-readable instructions, when executed by a processor, implementing the steps in the foregoing method embodiments.

In an embodiment, a computer program product is provided, where the computer program product includes computer-readable instructions, and the computer-readable instructions are stored in the computer-readable storage medium. The processor of the computer device reads the computer-readable instructions from the computer-readable storage medium, and the processor executes the computer-readable instructions, to cause the computer device to perform the steps in the method embodiments.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of this application, which are described specifically and in detail, but cannot be construed as a limitation to the patent scope of this application. For a person of ordinary skill in the art, several transformations and improvements can be made without departing from the idea of this application. These transformations and improvements belong to the protection scope of this application. Therefore, the protection scope of this application is subject to the protection scope of the appended claims. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A fog node scheduling method performed by a computer device, the method comprising:
    searching for candidate fog nodes storing a resource requested by a fog node scheduling request initiated by a client;
    performing effectiveness filtration on the candidate fog nodes to obtain effective fog nodes having predefined connectivity with the client, wherein the performing effectiveness filtration on the candidate fog nodes comprises:
        acquiring network information of the candidate fog nodes, and
        eliminating fog nodes corresponding to abnormal network information from the candidate fog nodes;
    acquiring collected load information of the effective fog nodes;
    performing scheduling in the effective fog nodes based on the load information to obtain a scheduling result, the scheduling result comprising an identification of a target fog node obtained through scheduling and service flow allocated to the target fog node; and
    returning the scheduling result to the client, wherein the client is configured to acquire the resource from the target fog node according to the identification and the service flow.

2. The method according to claim 1, wherein the searching for the candidate fog nodes storing the resource requested by the fog node scheduling request comprises:
    acquiring resource information of the resource requested by the fog node scheduling request;
    acquiring a pre-stored mapping relation from the resource information to fog node information; and
    searching for the fog node information based on the mapping relation and the resource information to obtain the candidate fog nodes.

3. The method according to claim 2, wherein the acquiring the resource information of the resource requested by the fog node scheduling request comprises:
    acquiring locally-cached resource information according to the fog node scheduling request when the resource information corresponding to the fog node scheduling request is locally cached;
    transmitting an inquiry request to an index server when no resource information corresponding to the fog node scheduling request is locally cached so as to enable the index server to inquire the resource information corresponding to the resource based on the inquiry request; and
    receiving the resource information fed back by the index server.

4. The method according to claim 1, wherein the method further comprises:
    determining a network type of a network with the candidate fog nodes, a supplier identification and a location; and
    screening the effective fog nodes according to the network type, the supplier identification and the location to obtain the effective fog nodes.

5. The method according to claim 1, wherein the performing effectiveness filtration on the candidate fog nodes further comprises:
    filtering the remaining candidate fog nodes based on peer-to-peer (P2P) connectivity between the remaining candidate fog nodes and the client.

6. The method according to claim 1, wherein the performing scheduling in the effective fog nodes based on the load information to obtain the scheduling result comprises:
ranking the effective fog nodes according to the load information to obtain an effective fog node sequence;
computing distribution probability of the fog nodes in the effective fog node sequence; and
performing scheduling on the effective fog node sequence according to the distribution probability to obtain the scheduling result.

7. The method according to claim 6, wherein the load information comprises an upload_capacity; and the ranking the effective fog nodes according to the load information comprises:
computing a weight of each effective fog node based on the upload_capacity;
selecting a variable value in a preset section;
computing a characteristic value of each effective fog node according to the weight and the variable value; and
ranking the effective fog nodes according to the characteristic values.

8. The method according to claim 6, wherein the load information comprises the upload_capacity and a real-time upload bandwidth value; and the computing the distribution probability of the fog nodes in the effective fog node sequence comprises:
acquiring initial distribution probability of each fog node in the effective fog node sequence;
computing a real-time bandwidth usage ratio of each fog node in the effective fog node sequence based on the upload_capacity and the real-time upload bandwidth value; and computing the distribution probability of each fog node in the effective fog node sequence according to the initial distribution probability, the real-time bandwidth usage ratio and target probability parameters.

9. The method according to claim 8, wherein the computing the distribution probability of each fog node in the effective fog node sequence according to the initial distribution probability, the real-time bandwidth usage ratio and the target probability parameters comprises:
computing the distribution probability of each fog node in the effective fog node sequence with the initial distribution probability, the real-time bandwidth usage ratio and the target probability parameters as parameters in a distribution probability computational formula, the distribution probability computational formula being:

$$p = \frac{p_0}{(1-p_0)e^{k \times \eta} + p_0}$$

p0 representing the initial distribution probability, k representing the target probability parameter, and η representing the real-time bandwidth usage ratio.

10. The method according to claim 8, further comprising:
acquiring bandwidth usage ratios of the fog nodes in the effective fog node sequence within a target historical time period;
computing a bandwidth usage ratio predicted value at next sampling time based on each bandwidth usage ratio; and
obtaining the target probability parameters according to the bandwidth usage ratio predicted values and adjustment on initial probability parameters by an adjustment factor.

11. The method according to claim 8, wherein the computing the real-time bandwidth usage ratio of each fog node in the effective fog node sequence based on the upload_capacity and the real-time upload bandwidth value comprises:
computing the real-time bandwidth usage ratio of each single-line fog node based on the upload_capacity and the real-time upload bandwidth value when fog nodes in the effective fog node sequence are the single-line fog nodes, and
sequentially selecting at least two lines from lines corresponding to multi-line aggregated fog nodes when fog nodes in the effective fog node sequence are the multi-line aggregated fog nodes, respectively computing real-time bandwidth usage ratios of the at least two lines, and making the maximum real-time bandwidth usage ratio as the real-time bandwidth usage ratio corresponding to the multi-line aggregated fog nodes.

12. A computer device, comprising a memory and a processor, the memory storing computer-readable instructions that, when executed by the processor, cause the computer device to implement a fog node scheduling method comprising:
searching for candidate fog nodes storing a resource requested by a fog node scheduling request initiated by a client;
performing effectiveness filtration on the candidate fog nodes to obtain effective fog nodes having peer-to-peer (P2P) connectivity with the client;
acquiring collected load information of the effective fog nodes;
performing scheduling in the effective fog nodes based on the load information to obtain a scheduling result, the scheduling result comprising an identification of a target fog node obtained through scheduling and service flow allocated to the target fog node; and
returning the scheduling result to the client, wherein the client is configured to acquire the resource from the target fog node according to the identification and the service flow.

13. The computer device according to claim 12, wherein the searching for the candidate fog nodes storing the resource requested by the fog node scheduling request comprises:
acquiring resource information of the resource requested by the fog node scheduling request;
acquiring a pre-stored mapping relation from the resource information to fog node information; and
searching for the fog node information based on the mapping relation and the resource information to obtain the candidate fog nodes.

14. The computer device according to claim 13, wherein the acquiring the resource information of the resource requested by the fog node scheduling request comprises:
acquiring locally-cached resource information according to the fog node scheduling request when the resource information corresponding to the fog node scheduling request is locally cached;
transmitting an inquiry request to an index server when no resource information corresponding to the fog node scheduling request is locally cached so as to enable the index server to inquire the resource information corresponding to the resource based on the inquiry request; and
receiving the resource information fed back by the index server.

15. The computer device according to claim 12, wherein the method further comprises:

determining a network type of a network with the candidate fog nodes, a supplier identification and a location; and screening the effective fog nodes according to the network type, the supplier identification and the location to obtain the effective fog nodes.

16. The computer device according to claim 12, wherein the performing effectiveness filtration on the candidate fog nodes comprises:

acquiring network information of the candidate fog nodes;

eliminating fog nodes corresponding to abnormal network information from the candidate fog nodes, and filtering the remaining candidate fog nodes based on peer-to-peer (P2P) connectivity between the remaining candidate fog nodes and the client.

17. The computer device according to claim 12, wherein the performing scheduling in the effective fog nodes based on the load information to obtain the scheduling result comprises:

ranking the effective fog nodes according to the load information to obtain an effective fog node sequence;

computing distribution probability of the fog nodes in the effective fog node sequence; and performing scheduling on the effective fog node sequence according to the distribution probability to obtain the scheduling result.

18. A non-transitory computer-readable storage medium, storing computer-readable instructions that, when executed by a processor of a computer device, cause the computer device to implement a fog node scheduling method comprising:

searching for candidate fog nodes storing a resource requested by a fog node scheduling request initiated by a client;

performing effectiveness filtration on the candidate fog nodes to obtain effective fog nodes having peer-to-peer (P2P) connectivity with the client;

acquiring collected load information of the effective fog nodes;

performing scheduling in the effective fog nodes based on the load information to obtain a scheduling result, the scheduling result comprising an identification of a target fog node obtained through scheduling and service flow allocated to the target fog node; and returning the scheduling result to the client, wherein the client is configured to acquire the resource from the target fog node according to the identification and the service flow.

19. The non-transitory computer-readable storage medium according to claim 18, wherein the searching for the candidate fog nodes storing the resource requested by the fog node scheduling request comprises:

acquiring resource information of the resource requested by the fog node scheduling request;

acquiring a pre-stored mapping relation from the resource information to fog node information; and searching for the fog node information based on the mapping relation and the resource information to obtain the candidate fog nodes.

20. The non-transitory computer-readable storage medium according to claim 19, wherein the acquiring the resource information of the resource requested by the fog node scheduling request comprises:

acquiring locally-cached resource information according to the fog node scheduling request when the resource information corresponding to the fog node scheduling request is locally cached;

transmitting an inquiry request to an index server when no resource information corresponding to the fog node scheduling request is locally cached so as to enable the index server to inquire the resource information corresponding to the resource based on the inquiry request; and receiving the resource information fed back by the index server.

* * * * *